(12) United States Patent
Vossoughian

(10) Patent No.: US 8,867,483 B1
(45) Date of Patent: Oct. 21, 2014

(54) SCIM PEERING

(75) Inventor: Matt Vossoughian, Arlington, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1525 days.

(21) Appl. No.: 11/958,807

(22) Filed: Dec. 18, 2007

(51) Int. Cl.
*H04W 4/00* (2009.01)

(52) U.S. Cl.
USPC ........ 370/331; 370/401; 370/411; 455/414.2; 455/432.3; 455/433; 455/436

(58) Field of Classification Search
USPC ............ 455/414.2, 414, 3, 432.1, 432.3, 433, 455/436–442; 370/331, 401, 411
See application file for complete search history.

(56) References Cited

U.S. PATENT DOCUMENTS

| | | | |
|---|---|---|---|
| 7,984,130 B2* | 7/2011 | Bogineni et al. | 709/223 |
| 2004/0146040 A1* | 7/2004 | Phan-Anh et al. | 370/349 |
| 2005/0083909 A1* | 4/2005 | Kuusinen et al. | 370/352 |
| 2005/0086494 A1* | 4/2005 | Carley | 713/182 |
| 2006/0052087 A1* | 3/2006 | Tuunanen et al. | 455/414.1 |
| 2006/0140385 A1* | 6/2006 | Haase et al. | 379/221.09 |
| 2006/0195565 A1* | 8/2006 | De-Poorter | 709/224 |
| 2007/0121890 A1* | 5/2007 | Li et al. | 379/221.13 |
| 2007/0195751 A1* | 8/2007 | Cai et al. | 370/352 |
| 2008/0037481 A1* | 2/2008 | Chiang et al. | 370/338 |
| 2008/0039085 A1* | 2/2008 | Phan-Anh | 455/435.1 |

OTHER PUBLICATIONS

3GPP TS 23.218 V7.4.0 Technical Specification, Global System for Mobile Communications, Dec. 2006, pp. 1-58, Valbonne, France, http://www.3gpp.org.
P-CSCF: An Introduction—The IMS Jungle. Apr. 30, 2008. http://theimsjungle.wordpress.com/2008/04/30/p-cscf-an-introduction.
PSec Security Associations between the UE and P-CSCF—The IMS Jungle. Aug. 17, 2008. http://theimsjungle.wordpress.com/?s=S-CSCF.

* cited by examiner

*Primary Examiner* — Alvin Zhu

(57) ABSTRACT

IMS technology can allow service providers to share services with each other over different IMS networks. A SCIM can operate with ISC and COPS interfaces to communicate with another similarly situated SCIM to monitor and query information from applications servers operating in IMS networks. When a mobile phone from a home IMS network roams in a visited IMS network, the mobile phone can access features through a tunnel back to the home IMS network while operating in the visited IMS network. The mobile may also access features in the visited IMS network.

16 Claims, 5 Drawing Sheets

SCIM PEERING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Today, a mobile device connected to an IP Multimedia Subsystem (IMS) cannot operate in another IP Multimedia Subsystem. If the mobile device moves from one IMS to another IMS, parameters assigned to the mobile device from the first IMS are lost in the second IMS. These parameters can include subscriber-specific features such as the type of service, the level of services, and the quality of service.

An adhoc solution has been created that duplicates subscriber-specific features in each IMS. Therefore, when the mobile device moves from one IMS to another IMS, the desired features will be available. However, this arrangement is quite expensive as it requires duplication of resources across multiple networks.

A solution is needed that would define new functions within an IMS that would allow it to communicate with another IMS network. The solution needs to allow a mobile device to access offered features but minimize duplication of resources.

SUMMARY

The present invention is defined by the claims below. Embodiments of the present invention solve at least the above problems by providing an apparatus, system and method for, among other things, allowing devices to operate across IMS networks, allowing Service Capability Interaction Managers (SCIMs) to communicate with each other across different IMS networks, and allowing a device to operate in different IMS networks.

In a first aspect, a SCIM is provided that allows devices to operate across IMS networks. The SCIM operates in an IMS network and recognizes an identifier for a remote device when the remote device enters the IMS network. The remote device is from a remote IMS network and operates a remote set of features provided by the remote IMS network. A remote SCIM is contacted in the remote IMS network using the identifier. The remote SCIM gathers information about the remote device. The information or a first subset thereof is received at the SCIM. A determination is made whether to allow the remote device to operate in the IMS network.

A system for operating SCIMs that communicate with each other across different IMS networks is provided that includes operating a first SCIM with a first COPS interface and a second SCIM with a second COPS interface. The first SCIM operates with a first ISC interface and the second SCIM operates with a second ISC interface. The first SCIM operates in a first IMS network and the second SCIM operates in a second IMS network. The first SCIM communicates with the second SCIM.

A method for allowing a device to operate in different IMS networks is provided that includes operating a first device with a first feature set provided by a first IMS network. The first device has an IP address associated with the first IMS network. The first device is moved from the first IMS network to a second IMS network. The first device operates with the first feature set or a subset thereof in the second IMS network.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
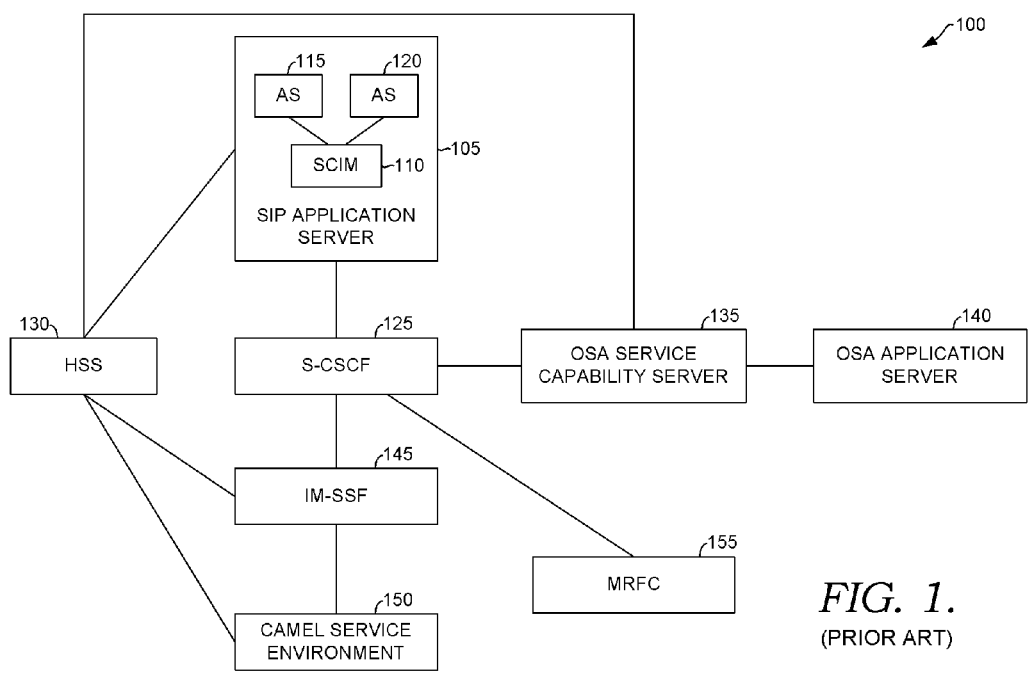
FIG. 1 is a block diagram of an exemplary IMS operating environment suitable for practicing an embodiment of the present invention.

Embodiments of the present invention provide an apparatus, system, and method for allowing mobile devices to operate in different IMS networks.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| CAMEL | Customized Applications for Mobile Network Enhanced |
| CD | Compact Disc |
| CD-ROM | Compact Disc-Read-Only Memory |
| COPS | Common Open Policy Service |
| DEC | Decision |
| DRQ | Delete Request State |
| DVD | Digital Versatile Discs |
| EEPROM | Electrically Erasable Programmable Read-only Memory |
| HSS | Home Subscriber Server |
| IM-SSF | IP Multimedia Service Switching Function |
| IMS | IP Multimedia Subsystem |
| IP | Internet Protocol |
| ISC | IP Multimedia Service Control |
| MRFC | Multimedia Resource Function Controller |
| OSA | Open Service Access |
| P-CSCF | Proxy Call Session Control Function |
| RAM | Random Access Memory |
| REQ | Request |
| ROM | Read-Only Memory |
| RPT | Report State |

| | |
|---|---|
| S-CSCF | Serving Call Session Control Function |
| SCIM | Service Capability Interaction Manager |
| SCS | Service Capability Server |

Further, various technical terms are used throughout this description. A definition of such terms can be found in *Newton's Telecom Dictionary* by H. Newton, 23rd Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions including data structures and program modules. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

SCIM Peering

Multiple IMS inter-working is shaping up due to the nature of IMS serving both wireless and wireline networks. IMS technology can let an IMS service provider share its services with other IMS service providers. A mobile device that operates in its home IMS network can access services from another IMS network. A mobile device that operates in a remote IMS network can access services from its home IMS network.

Typically, a SCIM acts as a gateway to access services within its own IMS network. However, with an implementation of an embodiment of the present invention, the notion of SCIM peering allows the SCIM in the IMS network to communicate with a peer SCIM in another IMS network to provide or block features to subscribers. Subscribers in a home IMS network can access services in a remote IMS network. Subscribers in the home IMS network can be blocked from accessing IMS services in the remote IMS network. Subscribers visiting from the remote IMS network can have access to the services from their home IMS network.

In FIG. 1, an IMS 100 is shown with a SIP application server 105, an S-CSCF 125, an HSS 130, an OSA service capability server (SCS) 135, an OSA application server 140, an IM-SSF 145, a Camel Service Environment 150, and a MRFC 155. SIP application server 105 includes a SCIM 110, an AS 115, and an AS 120. IMS 100 illustrates a typical architecture for an IP Multimedia Subsystem which may be described more fully in the document entitled 3rd Generation Partnership Project, 3GPP TS 23.218 V7.4.0 (2006-12), which is herein incorporated by reference.

In an implementation of an embodiment of the present invention, the SCIM 110, S-CSCF 125, and AS 115 or AS 120 perform the blending, orchestration, and policing of services provided to mobile devices communicating in IMS 100. To communicate across to another IMS network, SCIM 110 uses an ISC interface and a COPS interface whereby a SCIM from one IMS network can communicate with a SCIM from another network. The ISC interface enables communications between two SCIMs. In addition, the ISC interface enables communications between the SCIM, the S-CSCF 125, and the AS 115 or AS 120. Furthermore, the COPs interface enables SCIM 110 to monitor or query other devices located within its own or other IMS networks. Such devices include other SCIMs or other application servers.

Figure 2:
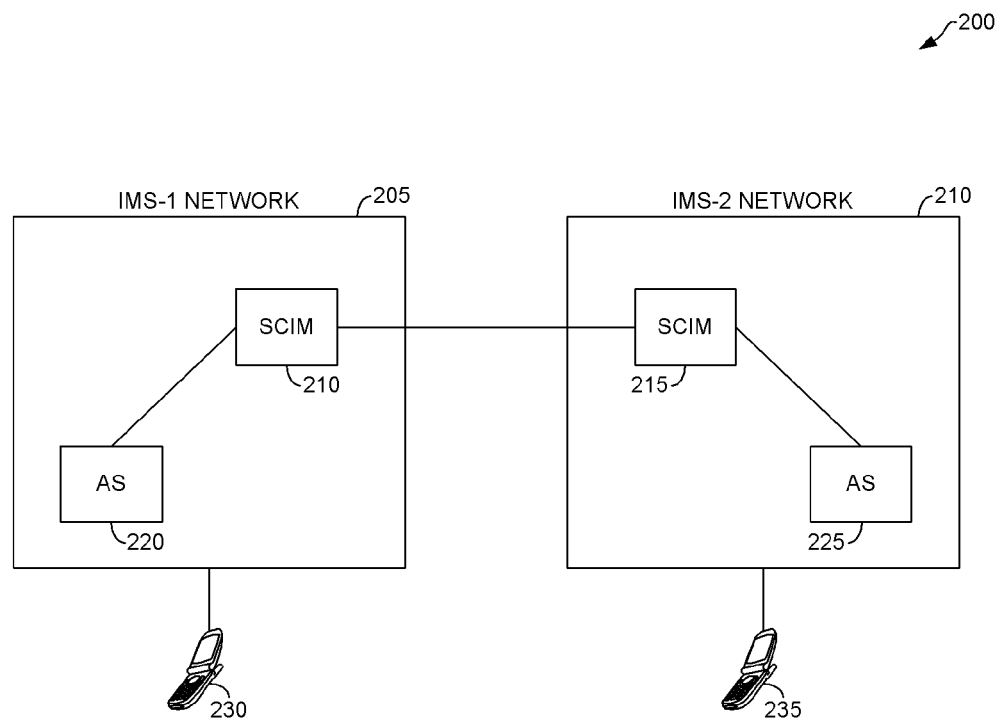
FIG. 2 is a block diagram of an exemplary peer IMS networks suitable for practicing an embodiment of the present invention.

Turning now to FIG. 2, peer IMS networks 200 are shown with an IMS 205 and an IMS 210. IMS 205 includes a SCIM 210, an AS 220, and a mobile device 230. IMS 210 includes a SCIM 215, an AS 225, and a mobile device 235. IMS 205 and IMR 210 represent IMS networks similar to IMS 100. With an implementation of an embodiment of the present invention, SCIM 210 can communicate with SCIM 215 over ISC and COPs interfaces. With this communication, mobile device 230 has the ability to access remote features in IMS 210. For example, mobile device 230, in its home network of IMS 205, can access remote features in AS 225 in IMS 210 through the communication of SCIM 210 and SCIM 215. Based on certain policies, SCIM 210 can allow or block access to features in IMS 210. Likewise, SCIM 215 may allow or block access to features in IMS 210 even if access is allowed by SCIM 210. If mobile device 230 is a visiting device from IMS 210 that wants to operate in IMS 205, mobile device 230 can access it home features in AS 225 in IMS 210 through the communication of SCIM 210 and SCIM 215. Mobile device 230 can also access features in IMS 205 if allowed by SCIMs 210 and 215.

As discussed above, several scenarios can occur for a mobile device to communicate across IMS networks. In one scenario, the mobile device that operates in its home IMS network may want to access features in a remote IMS network. This scenario can occur when two distinct IMS networks provide different features, but can also occur when IMS networks provide the same features. For example, the remote IMS network may carry a feature such as video streaming that is not found in the home IMS network. The home SCIM can provide information about the mobile device to the remote SCIM to gain access to the remote application server such as AS 225. In this scenario, AS 225 would provide the application for video streaming.

In another scenario, the mobile device that operates in its home network may be blocked from accessing features in the remote IMS network. The home SCIM in the home IMS network attempts to communicate with the remote SCIM in the remote IMS network to access information. However, the remote SCIM blocks access to the mobile device. This blocking can be due to various situations such as a lack of agreement between service providers of the IMS networks, low priority status assigned to the subscriber, or an incompatibility of services between the mobile device and the remote IMS network, to name a few. In addition, the home SCIM may also block access to the mobile device without attempting to communicate with the remote SCIM. This blocking may be based on the similar issues mentioned above or an entirely different set of criteria.

In yet another scenario, the mobile device may be a visitor in the IMS network. Devices in the IMS network recognize the mobile device as a visitor based on the IP address assigned to the mobile device. The subscriber using the mobile device may desire to access features in its home IMS network which is the remote IMS network for purposes here. As discussed above, service agreements can determine the behavior of SCIMs in both IMS networks in deciding whether the mobile device will be able to access features in the remote IMS network. Furthermore, the SCIM in the IMS network has to determine if the mobile device will be entitled to access features offered in the IMS network. In either case, the SCIM in the IMS network plays a role in accessing subscriber or device information in the remote SCIM and AS.

As an example, the mobile device may desire to access banking services from its remote IMS network while operating in the visited IMS network. Such access may be denied due to the sensitivity of the banking information or the high security risks involved. However, this service may be provided at the moment the mobile device re-enters the remote IMS network (its home network).

Figure 3:
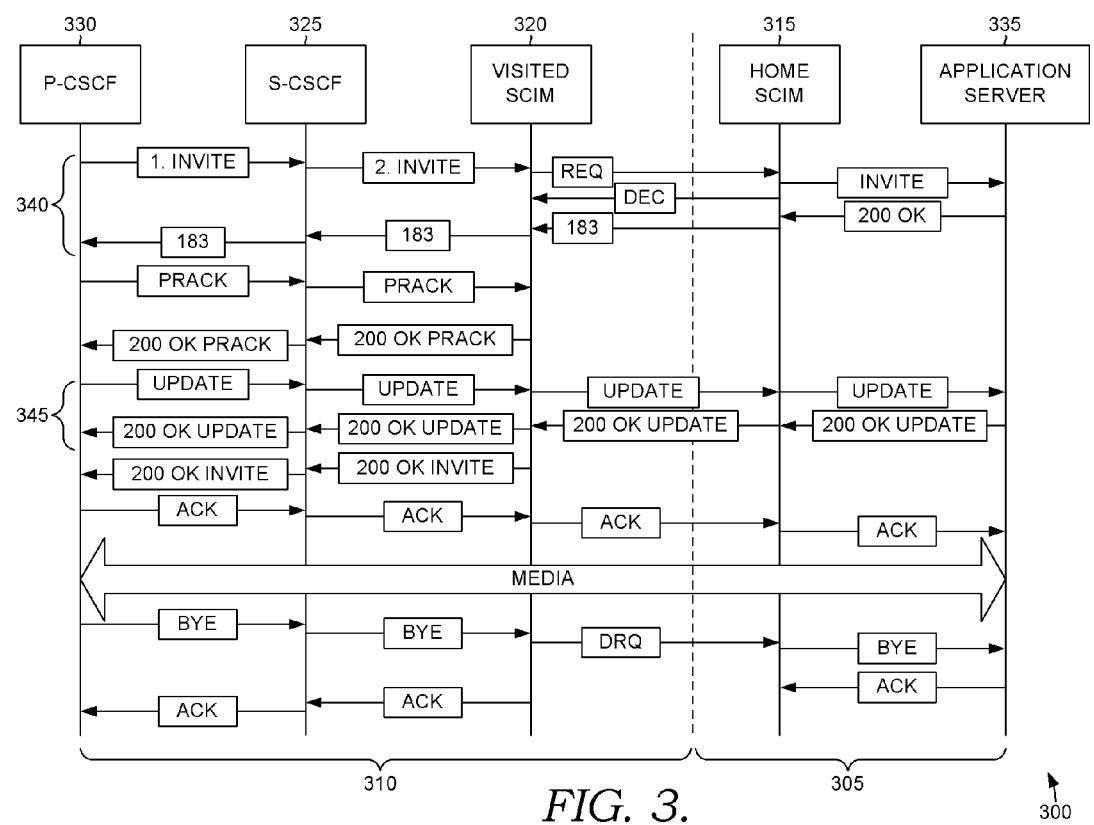
FIG. 3 is a diagram of exemplary messages transferred between devices when practicing an embodiment of the present invention.

In FIG. 3, an exemplary message flow 300 is provided with an IMS 305, an IMS 310, a home SCIM 315, a visited SCIM 320, an S-CSCF 325, a P-CSCF 330, an application server 335, an initial message 340, and an updated message 345. Typically, P-CSCF 330 is the first point of contact into the IMS network. As such, message flow 300 illustrates a call flow of mobile device 230 operating in IMS 310 that desires to access features in its home IMS 305. When mobile device 230 attempts to access features in IMS 305, initial message 340 occurs. In initial message 340, P-CSCF 330 sends a SIP invite message to S-CSCF 325 which sends a SIP invite message to visited SCIM 320. Visited SCIM 320 communicates over the ISC and COPS interfaces to home SCIM 315 with a request. Home SCIM 315 knows about the mobile device and sends a SIP invite message to application server 335 to get data and application information based on the request. Such information may include subscriber information that can aid the SCIMs in determining whether to allow the mobile device to access the features. As a result, a decision is sent from home SCIM 315 to visited SCIM 320 on whether the mobile device can access the features.

If the mobile device is allowed to access features in IMS 305, a path is opened from the mobile device back to its home application server 335 which can provide the service or applications requested by the mobile device. In update message 345, the path established between P-CSCF 330 and application server 335 allows data to flow back and forth. So, if a feature in IMS 305 is found which is not available in IMS 310, the mobile device can access the feature without interrupting service. To establish the path, P-CSCF 330 sends a SIP update message to S-CSCF 325 which sends the SIP update message to visited SCIM 320. Visited SCIM 320 sends the SIP updated message to home SCIM 315 which sends the SIP update message to application server 335. Application server 335 in turn sends an "OK" message back through the devices to P-CSCF 330. As a result, the communication tunnel is established between the mobile device and the application server 335.

It is noted that one of ordinary skill in the art understands that FIG. 3 is an exemplary message flow and that other message flows may exist when implementing different embodiments of the present invention. For example, a different message flow can occur when a mobile device, in its home IMS network, requests services in a remote IMS network. Further, a different message flow can occur when the mobile device is blocked from accessing features in the remote IMS network.

Figures 4, 5:
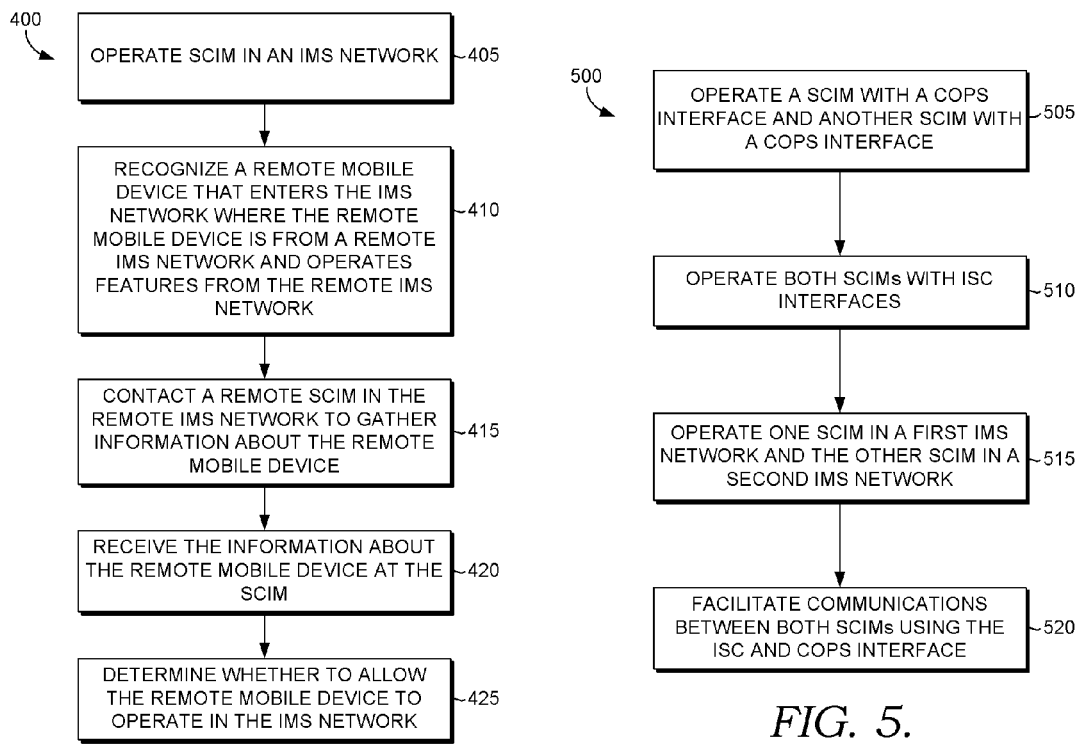
FIG. 4 is a flowchart of an exemplary process for allowing devices to operate across IMS network when practicing an embodiment of the present invention.
FIG. 5 is a flowchart of an exemplary process for allowing SCIMs to communicate with each other across different IMS networks when practicing an embodiment of the present invention.

Turning now to FIG. 4, a process for allowing devices to operate across IMS network is provided in a method 400. In a step 405, SCIM 210 operates in IMS network 205. In a step 405, SCIM 210 recognizes mobile device 230 that enters IMS network 205. Mobile device 230 is from IMS network 210 and operates features from IMS network 210. In a step 415, SCIM 210 contacts SCIM 215 in IMS network 210 to gather information about mobile device 230. Such information can also be obtained from AS 225. This information may include subscriber information such as the type of service, level of service, and quality of service mobile device 230 may have.

In a step 420, SCIM 210 receives information about mobile device 230. In a step 425, SCIM 210 determines whether mobile device 230 is allowed to operate in IMS network 205 based on the information gathered from SCIM 215. The determination also depends on the service agreements between the service providers of the two IMS networks which may be pre-arranged.

In FIG. 5, a process for allowing SCIMs to communicate with each other across different IMS networks is provided in a method 500. In a step 505, home SCIM 315 and visited SCIM 320 operate with COPS interfaces. In a step 510, home SCIM 315 and visited SCIM 320 also operate with ISC interfaces. These interfaces can be bundled together in one hardware implementation. In a step 515, home SCIM 315 operates in IMS network 305 and visited SCIM 320 operates in IMS network 310. In a step 520, home SCIM 315 and visited SCIM 320 communicate with each other over the COPS and ISC interfaces.

Figure 6:
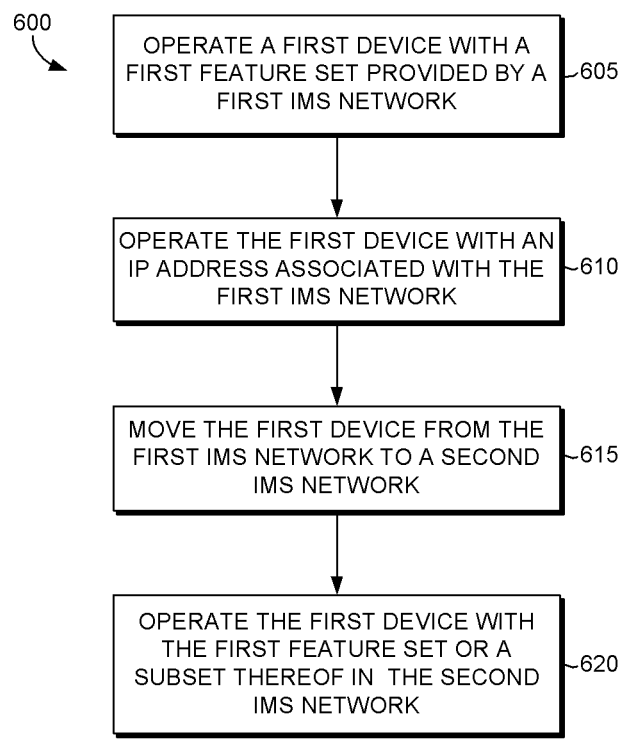
FIG. 6 is a flowchart of an exemplary process for allowing a device to operate in different IMS networks when practicing an embodiment of the present invention.

Turning now to FIG. 6, a process for allowing a device to operate in different IMS networks is provided in a method 600. In a step 605, a mobile phone operates with a first features set provided by a first IMS network. The mobile phone, such as mobile device 230, can originally be provisioned by IMS network 210. In a step 510, the mobile phone operates with an IP address associated with the first IMS network. Mobile device 230 is initially provisioned by IMS network 210 and is assigned an IP address associated with IMS network 210.

In a step 515, the mobile phone moves from the first IMS network to a second IMS network. Mobile device 230 moves from its home IMS network 210 to become a visitor in IMS network 205. Hence, FIG. 2 illustrates mobile device 230 as a visitor in IMS network 205. In a step 520, the mobile phone is capable of operating the feature set assigned to it in IMS network 210 while it is roaming as a visitor in IMS network 205. In some cases, the mobile phone may only be allowed to access a subset of it features. Mobile device 230 can access it features from AS 225 through SCIMs 210 and 215.

The prior discussion is only for illustrative purposes to convey exemplary embodiments. The steps discussed in FIGS. 4-6 may be executed without regards to order. Some steps may be omitted and some steps may be executed at a different time than shown. For example, step 425 may be executed before step 420. Step 510 may be executed before step 505. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A Session Capability Interaction Manager (SCIM) having a processor and a memory, the SCIM for performing a method to allow devices to operate across IP Multimedia Subsystem (IMS) networks, comprising:
   operating the SCIM in an IMS network, wherein the IMS network includes a Session Initiation Protocol (SIP) application server, and wherein the SIP application server includes the SCIM that interacts with a Serving Call Session Control Function (S-CSCF) and a Proxy Call Session Control Function (P-CSCF);
   at the SCIM, recognizing an identifier of a remote device when the remote device enters the IMS network, wherein the remote device enters the IMS network from a remote IMS network and, wherein the remote device operates a remote set of features provided by the remote IMS network, when in the remote IMS network;
   at the SCIM, utilizing a Common Open Policy Service (COPS) protocol to contact a remote SCIM in the remote IMS network using the identifier, wherein the SCIM communicates a request to the remote SCIM in the remote network for whether the first device is allowed to access the remote set of features,
   wherein, upon receiving the identifier, the remote SCIM gathers and conveys information about the remote device, the information including data about the remote set of features;
   receiving at the SCIM the information from the remote SCIM, wherein the information includes a decision on whether the remote device is allowed to operate the remote set of features;
   determining whether to allow the remote device to operate in the IMS network based on, in part, the information; and
   when the remote device is allowed to operate the remote set of features, then establishing a path between the P-CSCF in the IMS network and an application server in the remote IMS network, by which the remote device accesses the remote set of features.

2. The SCIM of claim 1, wherein allowing the remote device to operate the remote set of features comprises accessing a remote application server in the remote IMS network to identify the remote set of features provided to the remote device.

3. The SCIM of claim 1, further comprising allowing the remote device to operate a set of features in the IMS network wherein an application server in the IMS network identifies the set of features provided to the remote device.

4. A system for operating Session Capability Interaction Managers (SCIMs) that communicate with each other across different IP Multimedia Subsystem (IMS) networks, comprising:
   a first IMS network with
      A) a first Session Initiation Protocol (SIP) application server that includes a first SCIM,
      B) a first Serving Call Session Control Function (S-CSCF) server, and
      C) a first Proxy Call Session Control Function (P-CSCF) server,
   the first SCIM interacting with a first Common Open Policy Service (COPS) interface and a first Internet Protocol Multimedia Service Control (ISC) interface; and
   a second IMS network with
      A) a second Session Initiation Protocol (SIP) application server that includes a second SCIM,
      B) a second S-CSCF and
      C) a second P-CSCF,
   the second SCIM interacting with a second COPS interface and a second ISC interface,
   wherein the first ISC interface and the second ISC interface enable communication between the first SCIM and the second SCIM,
   wherein the first COPS interface and the second COPS interface enable the first SCIM and second SCIM to monitor and query devices in the first and second IMS networks;
   wherein when a device associated with the first IMS network, and provided a first set of services by the first IMS network, enters the second IMS network, then the second SCIM in the second IMS network communicates, by way of the COPS interface, a request to the first SCIM in the first IMS network for whether the device is allowed to access the first set of services;
   wherein, upon receiving from the first SCIM, by way of the COPS interface, a decision on whether the device is allowed to access the first set of services, the second SCIM determines whether to allow the device to access the first set of services provided by the first IMS network, and wherein when the device is allowed to access the first set of services, then establishing a path between the P-CSCF in the second IMS network and an application server in the first IMS network, by which the device accesses the first set of services.

5. The system of claim 4, wherein the first SCIM is configured to allow a first device to operate in the first IMS network and to access the first set of services provided in the first IMS network.

6. The system of claim 5, operating wherein the first SCIM is configured to allow the first device to operate in the first IMS network and to access a second set of services provided in the second IMS network.

7. The system of claim 5, further comprising operating wherein the first SCIM is configured to allow the first device to operate in the first IMS network and to block the first device from accessing a second set of services provided in the second IMS network.

8. The system of claim 5, further comprising operating wherein the second SCIM is configured to allow a first device to operate in the second IMS network and to access the first set of services provided in the first IMS network.

9. The system of claim 8, further comprising operating wherein the second SCIM is configured to allow the first device to operate in the second IMS network and to access a second set of services provided in the second IMS network.

10. The system of claim 5, further comprising operating wherein the second SCIM is configured to allow the first device to operate in the second IMS network and to block the first device from accessing a second set of services provided in the second IMS network.

11. The system of claim 5, wherein the first COPS interface is bundled with the first ISC interface and the second COPS interface is bundled with the second ISC interface.

12. The system of claim 11, wherein the first COPS interface is a first subset of the first ISC interface and the second COPS interface is a second subset of the second ISC interface.

13. A method for allowing a device to operate in different Internet Protocol (IP) Multimedia Subsystem (IMS) networks, comprising:
　providing a first feature set to a first device operating in a first IMS network, wherein the first IMS network includes an application server that provides the first feature set, wherein the first IMS network includes a first Service Capability Interaction Manager (SCIM) server, and wherein the first SCIM communicates via an IP Multimedia Service Control (ISC) protocol and a Common Open Policy Service (COPS) protocol, and wherein the first device has an IP address associated with the first IMS network;
　upon the first device roaming from the first IMS network to a second IMS network, providing, by the application server in the first IMS network, the first feature set or a first subset thereof to the first device operating in the second IMS network, wherein the second IMS network includes a Proxy Call Session Control Function (P-CSCF) server, wherein the second IMS network includes a second Service Capability Interaction Manager (SCIM) server, wherein the second SCIM communicates via the ISC protocol and the COPS protocol, and wherein the first feature set or the first subset thereof is of the first IMS network and includes at least one of:
　　A) a type of service, and
　　B) one or more levels of service;
　wherein providing the first feature set or the first subset thereof to the first device operating in the second IMS network includes
　　A) communicating from the second SCIM in the second IM network to the first SCIM in the first IMS network, by way of the COPS interface, a request for whether the first device is allowed to access the first feature set or the first subset thereof,
　　B) at the second SCIM, receiving from the first SCIM, by way of the COPS interface, a decision on whether the first device is allowed to access the first feature set or the first subset thereof, and
　　C) based on the received decision, when the first device is allowed to access the first feature set or the first subset thereof, then establishing a path between the P-CSCF server in the second IMS network and the application server in the first IMS network, by which the first device accesses the first feature set or the first subset thereof provided by the application server in the first IMS network.

14. The method of claim 13, further comprising operating the first device with a second feature set or a second subset thereof provided by the second IMS network.

15. The method of claim 14, further comprising moving the first device to a third IMS network.

16. The method of claim 15, further comprising operating the first device with at least one of:
　the first feature set or a first subset thereof;
　the second feature set or a second subset thereof; and
　a third feature set or a third subset thereof provided by the third IMS network.

* * * * *